(12) United States Patent
Xu

(10) Patent No.: US 10,798,583 B1
(45) Date of Patent: Oct. 6, 2020

(54) MOBILE DEVICE USER DETECTION

(71) Applicant: PayPal, Inc., San Jose, CA (US)

(72) Inventor: Shipeng Xu, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/594,509

(22) Filed: Oct. 7, 2019

(51) Int. Cl.
  *G10L 25/51* (2013.01)
  *H04W 12/12* (2009.01)

(52) U.S. Cl.
  CPC ......... *H04W 12/1204* (2019.01); *G10L 25/51* (2013.01)

(58) Field of Classification Search
  CPC ..................... H04W 12/1204; G10L 25/51
  See application file for complete search history.

(56) References Cited

U.S. PATENT DOCUMENTS

| | | | | |
|---|---|---|---|---|
| 9,439,163 B2* | 9/2016 | Ward | ................... | H04W 64/00 |
| 10,206,098 B2* | 2/2019 | Sivaganesh | ........... | H04W 12/04 |
| 2012/0062729 A1* | 3/2012 | Hart | ....................... | H04N 7/142 348/135 |
| 2014/0355389 A1* | 12/2014 | Reunamaki | ............ | H04W 4/21 367/197 |
| 2018/0336892 A1* | 11/2018 | Kim | ....................... | G10L 15/30 |
| 2019/0287525 A1* | 9/2019 | Kim | ........................ | G10L 25/51 |

* cited by examiner

*Primary Examiner* — Julio R Perez (57) ABSTRACT

According to the present disclosure, operations may include receiving an action request from a mobile device having a microphone and a speaker. The operations may further include determining whether the mobile device is being physically held by a user. The determining may include transmitting electronic instructions to the mobile device, the electronic instructions executable by the mobile device to cause the mobile device to generate an audio detection waveform via the speaker and measure an audio response waveform via the microphone. The audio response waveform may be based on the audio detection waveform. The determining may also include analyzing the audio response waveform to determine whether the mobile device is being physically held by the user. In addition the operations may include performing a particular operation with respect to the action request based on the determination as to whether the mobile device is being held by the user.

20 Claims, 8 Drawing Sheets

MOBILE DEVICE USER DETECTION

FIELD

Embodiments of the disclosure relate to mobile device user detection (e.g. whether a human being is using a mobile device).

BACKGROUND

Mobile devices may be emulated or part of mobile device farms that automatically perform certain actions without user input. In some instances, emulated mobile devices or mobile device farms may be used for nefarious purposes such as attempts to perform malicious actions that affect system security.

BRIEF DESCRIPTION OF THE DRAWINGS

Example embodiments will be described and explained with additional specificity and detail through the use of the accompanying drawings in which.

DETAILED DESCRIPTION

Mobile device farms may include a large number of physical mobile devices that are running automated actions without direct user involvement. Similarly, emulation software may be configured to mimic a physical mobile device by running or appearing to run a particular mobile device platform and one or more mobile applications to generate an emulated mobile device. The emulated mobile device may appear as a physical mobile device to third-parties (e.g., service provider systems) but may not be an actual physical mobile device (e.g. software running on a virtual machine of a computer system rather than a consumer smartphone such as an Apple iPhone™ or Samsung Galaxy™). In some instances, a single computing system may run emulation software to create multiple emulated mobile devices at the same time.

Mobile device farms and emulated mobile devices may be used for malicious purposes and may represent a security vulnerability for service provider systems in some instances. For example, a particular service provider system may be accessed via a particular mobile application. In some instances, a large number of physical mobile devices of a mobile device farm and/or emulated mobile devices running or appearing to run the particular mobile application may be used in a denial of service attack of the particular service provider system. In some instances, account takeover attackers and money launderers may automate batch money transfers from device farms. Additionally or alternatively, mobile device farms and/or emulated mobile devices may be configured to tamper with one or more interfaces of the particular mobile application, such as by modifying data presented to the particular service provider system to obtain potentially sensitive data from the particular service provider system or to attempt to perform fraudulent transactions (e.g., fraudulent use of accounts, fraudulent spending of money, etc.) with respect to the particular service provider system. As such, detection of whether a user is physically using a mobile device may help reduce attack vulnerabilities of service provider systems because such nefarious actions are often performed in an automated, brute force type of manner that does not include users physically using each mobile device. One reason that malicious actors may use a mobile device farm is that by using a physical mobile device, it will be easier for those actors to overcome certain automated checks that may seek to determine whether a real physical device is present (e.g. vs. a software emulated device).

According to one or more embodiments of the present disclosure, a determination may be made as to whether a mobile device is being physically held by a user to determine whether a user is physically using the mobile device. In some embodiments, the determination may be made based on an audio detection waveform that may be emitted by a speaker of the mobile device. The mobile device may be configured to detect, via a microphone, an audio response waveform that may be based on the audio detection waveform (e.g., the audio response waveform may be a reflection of at least a portion of the audio detection waveform and/or a portion of the audio detection waveform that is detected by the microphone). As explained in detail below, it may be determined whether the mobile device is physically being held by a user based on one or more characteristics of the audio response waveform. In the present disclosure, a determination that the mobile device is not physically being held by a user may indicate that the mobile device is part of a mobile device farm or is an emulated mobile device as opposed to a real mobile device. Note that in various embodiments, description herein refers to whether or a not a user is holding a mobile device. In other contemplated embodiments, similar structures and techniques may be adapted suitably to determine if the mobile device is in other proximity to a user (e.g. placed within a specific distance of a user, present within a user's pocket or handbag or backpack, etc.).

One or more example embodiments are explained with reference to the accompanying drawings.

Figure 1A:
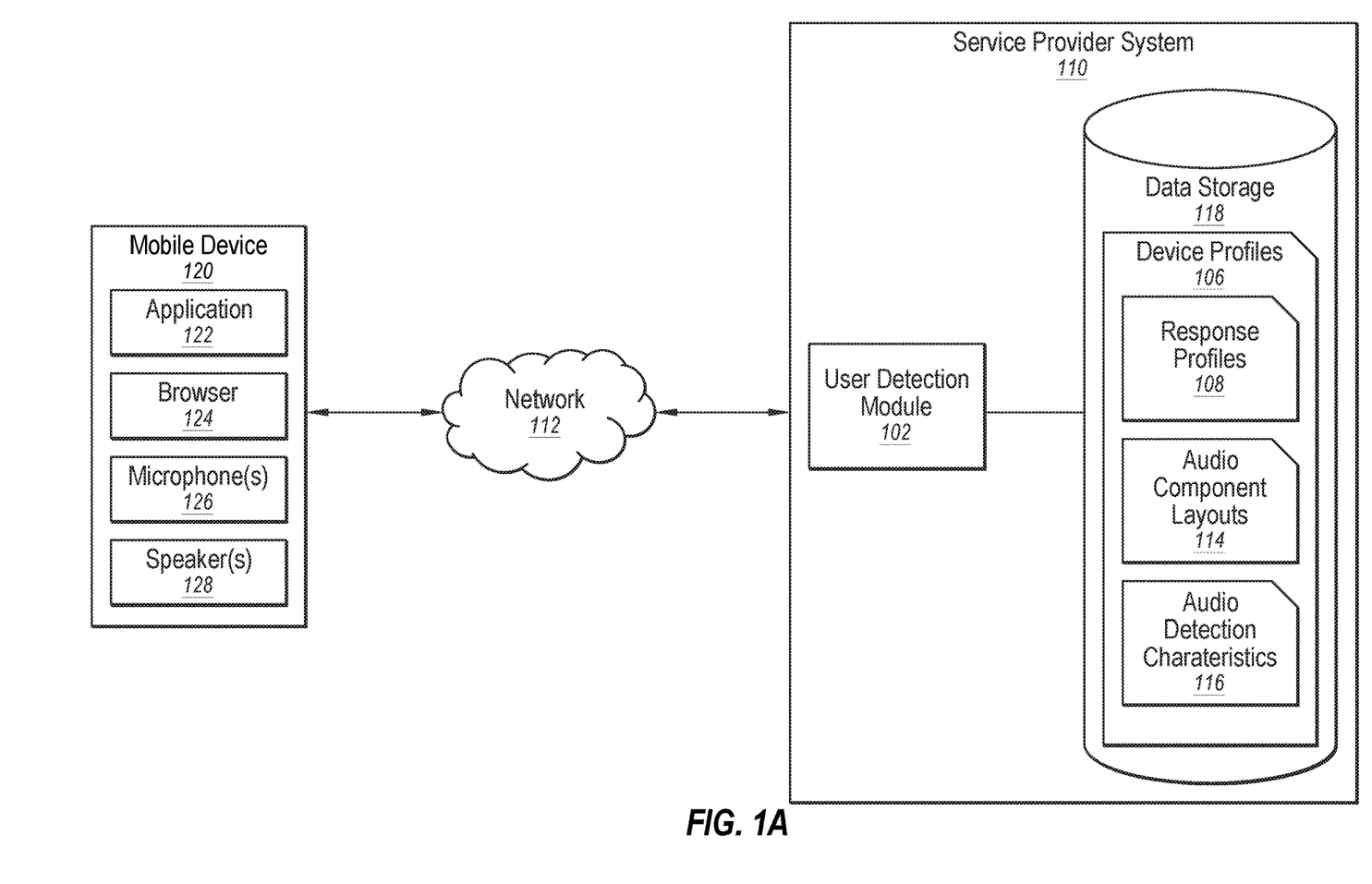
FIG. 1A is a diagram illustrating an example environment that may be used to determine whether a mobile device is being physically held by a user.

FIG. 1A is a diagram illustrating an example environment 100 that may be used to determine whether a mobile device 120 is being physically held by a user. The environment 100 may be arranged according to one or more embodiments, such as one or more of the example embodiments disclosed below. As detailed below, the environment 100 may include a mobile device 120, a service provider system 110 ("system 110"), and a network 112.

The system 110 may be configured to receive requests to access and engage with the system 110 from the mobile device 120. As detailed below, the system 110 may be configured to make a determination as to whether the mobile device 120 is physically being held by a user. In these or other embodiments, the system 110 may be configured to perform one or more operations that may be based on the determination as also discussed in further detail below.

The network 112 may include a wired network, a wireless network, or any combination thereof configured to communicatively couple devices or systems. For example, the network 112 may communicatively couple the mobile device 120 to the system 110. The network 112 may include any suitable configuration or configurations including a star configuration, token ring configuration, or other configurations. The network 112 may include a local area network (LAN), a wide area network (WAN) (e.g., the Internet), and/or other interconnected data paths across which multiple devices or systems may communicate. In some embodiments, the network 112 may include a peer-to-peer network.

Additionally or alternatively, the network 112 may also be coupled to or may include portions of a telecommunications network for sending data in a variety of different communication protocols. In some embodiments, the network 112 may include an Internet Protocol (IP) based network such as the Internet. In some embodiments, the network 112 may include cellular communication networks for sending and receiving communications and/or data including via hypertext transfer protocol (HTTP), direct data connection, wireless application protocol (WAP), etc. The network 112 may also include a mobile data network that may include third-generation (3G), fourth-generation (4G), fifth-generation (5G), long-term evolution (LTE), long-term evolution advanced (LTE-A), Voice-over-LTE, Voice-over-IP, or any other mobile data network or combination of mobile data networks.

The mobile device 120 may be any suitable system, apparatus, or device that may be configured as a mobile device. For example, the mobile device 120 may be a smartphone or a tablet computer in some embodiments.

The mobile device 120 may include one or more speakers 128 each configured to emit sound. In some embodiments, the speakers 128 may be configured as stereo speakers. Additionally or alternatively, the speakers 128 may be configured to emit sound together or independently of each other. As discussed in further detail below, one or more of the speakers 128 may be configured to emit audio detection waveforms that may be used to determine whether the mobile device 120 is physically being held by a user.

The mobile device 120 may include one or more microphones 126. Each of the microphones 126 may include any suitable system or device configured to detect sound and to generate a corresponding microphone signal based on the detected sound. The corresponding microphone signal may be a measurement of the detected sound. In some embodiments, the microphone signals may be generated by the microphones 126 as analog signals. In some embodiments, the microphones 126 may be omnidirectional microphones that may have a same or substantially same response with respect to detecting sound in all directions. Additionally or alternatively, in some embodiments, the microphones 126 may be positioned and spaced with respect to each other in a known and/or specific manner. The spacing and positioning may be used to perform beamforming of the microphone signals in some instances. As discussed in further detail below, one or more of the microphones 126 may be configured to measure audio response waveforms that may correspond to the audio detection waveforms that may be emitted by the speakers 128. The audio response waveforms may include reflections of at least a portion of the audio detection waveforms, at least a portion of the audio detection waveforms that are emitted by the speakers 128, or any suitable combination thereof. As detailed below, the audio response waveforms may be used to determine whether the mobile device 120 is physically being held by a user.

The mobile device 120 may be configured to submit requests to the system 110 to access or engage in services provided by the system 110. For example, to engage with the system 110, the mobile device 120 may initiate a mobile application 122 ("application 122") or browser 124 which may generate a request to access the system 110 via the network 112. In some embodiments, the application 122 may be an application downloaded from an app store to the mobile device 120. Additionally or alternatively, the application 122 may be specific to the system 110 and may provide a compatible and secure interface with the system 110. In some embodiments, the application 122 or browser 124 may send requests to the system 110 via the network 112, and may respond to requests or inquiries received from the system 110 by providing data to the system 110 via the network 112.

The system 110 may be associated with a service provider that may provide any of various network accessible services such as for example, financial services, e-commerce services, data storage services, data processing services, entertainment services, informational services, educational services, etc. In some embodiments, the system 110 may be configured as a server system that includes one or more computing systems configured to perform operations related to providing the network accessible services of the service provider.

In some embodiments, the system 110 may be communicatively coupled to or include a data storage 118. In some embodiments, the data storage 118 may include data stored thereon that may be used to make determinations regarding whether a user is physically holding the mobile device 120, as discussed in further detail below.

In some embodiments, the system 110 may include a user detection module 102 ("detection module 102"), configured to make a user detection determination as to whether the mobile device is being physically held by the user. In the present disclosure, reference to "physical user determinations" may be a shorthand manner of referring to determinations as to whether a mobile device is being physically held by a user. The detection module 102 may include executable code and routines configured to enable a computing device to perform one or more operations as described herein to make determinations as to the presence of a physical user. Additionally or alternatively, the detection module 102 may be implemented using hardware including a processor, a microprocessor (e.g., to perform or control performance of one or more operations), a field-programmable gate array (FPGA), or an application-specific integrated circuit (ASIC). In some other instances, the detection module 102 may be implemented using a combination of hardware and software. In the present disclosure, operations described as being performed by the detection module 102 may include operations that the detection module 102 may direct a corresponding system (e.g., the system 110) to perform.

In some embodiments, the detection module 102 may be configured to make the detection determination based on one or more device profiles 106 that may be stored in the data storage 118, as detailed below.

The device profiles 106 may include one or more characteristics of each of one or more different types (e.g., brands, models, etc.) of mobile devices that may affect detection as to whether a mobile device is being physically held by a user. For example, the detection module 102 may be configured to determine whether the mobile device 120 is being physically held by a user based on one or more characteristics of an audio response waveform that may be based on an audio detection waveform emitted by one or more of the speakers 128 in which the audio response waveform may be measured by one or more of the microphones 126. In some embodiments, the layout of the emitting speaker(s) 128 and the measuring microphone(s) 126 on the mobile device 120 with respect to each other may affect one or more characteristics of the audio response waveform. As such, different layouts of emitting speakers 128 in relation to measuring microphones 126 may result in different audio response waveforms used to make physical user determinations. In some embodiments, the device profiles 106 may accordingly include audio component layouts 114 that may each indicate a layout of microphones and speakers of each of one or more of the devices of the device profiles 106.

Figure 1B:
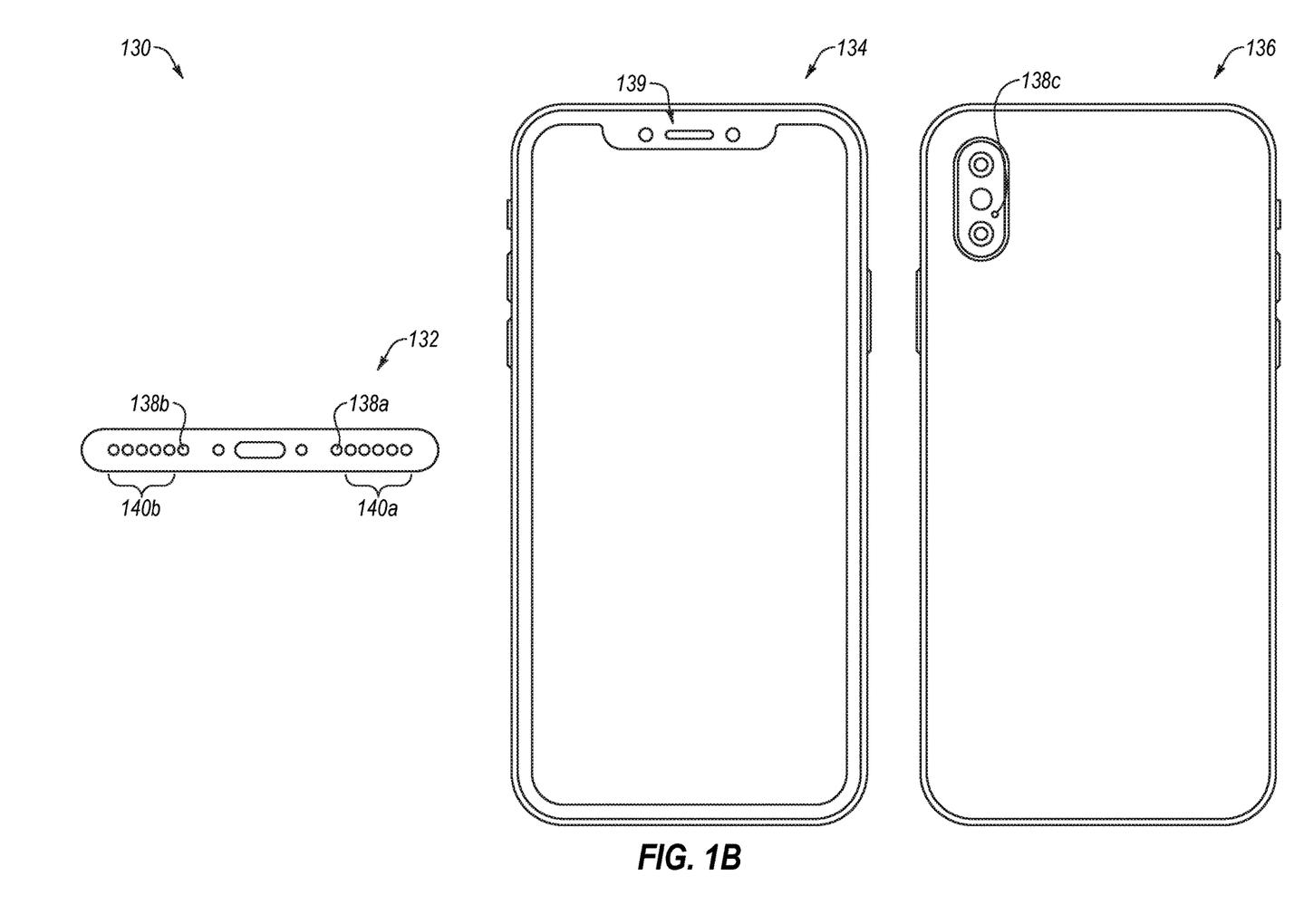
FIG. 1B is a diagram of an example mobile device that may be represented by a first device profile of the device profiles of FIG. 1A.

For example, FIG. 1B illustrates an example mobile device 130 that may be represented by a first device profile of the device profiles 106 of FIG. 1A. The example mobile device 130 may be an Apple® iPhone 7® As indicated by FIG. 1B, the mobile device 130 may include a first bottom microphone 138a and a second bottom microphone 138b located at a bottom 132 of the mobile device 130, as illustrated. In addition, the mobile device 130 may include a front microphone and a front speaker located at a top portion 139 of a front 134 of the mobile device 130, as illustrated. Moreover, the mobile device 130 may include a rear microphone 138c located at a top portion of a rear 136 of the mobile device 130, as illustrated. The mobile device 130 may also include a bottom speaker 140a and a bottom speaker 140b located at the bottom 132 of the mobile device 130, as illustrated.

In these or other embodiments, the audio component layouts 114 may include a first audio component layout included in the first device profile. The first audio component layout may indicate the layout of the microphones 138 and speakers 140 of the mobile device 130. The first audio component layout may indicate the relative locations of the microphones 138 and the speakers 140 with respect to each other. Additionally or alternatively, the first audio component layout may indicate relative distances of the microphones 138 and the speakers 140 between each other. In these or other embodiments, the first audio component layout may indicate relative directions of emission of audio waveforms by the speakers 140 and/or relative directions of detection of audio waveforms by the microphones 138.

Figure 1C:
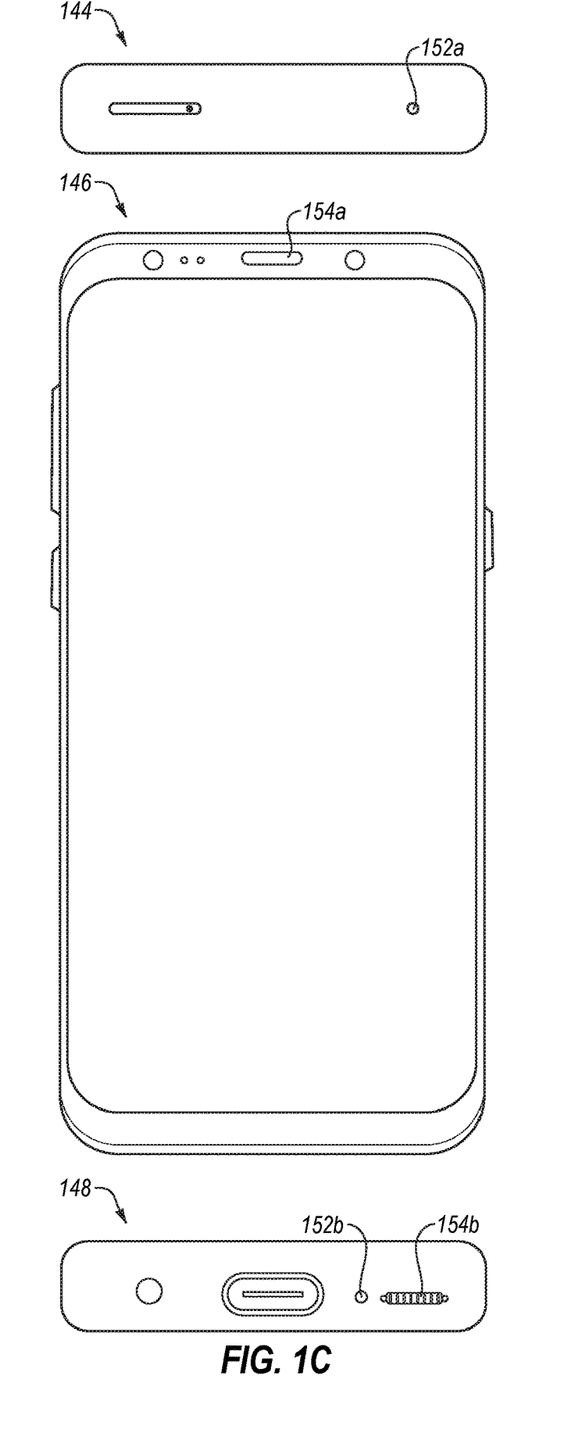
FIG. 1C is a diagram of another example mobile device that may be represented by a second device profile of the device profiles of FIG. 1A.

As a comparison, FIG. 1C illustrates an example mobile device 142 that may be represented by a second device profile of the device profiles 106 of FIG. 1A. The example mobile device 142 may be a Samsung® Galaxy S9®. As indicated by FIG. 1C, the mobile device 142 may include a top microphone 152a located at a top 144 of the mobile device 142, as illustrated. In addition, the mobile device 142 may include a bottom microphone 152b located at a bottom 148 of the mobile device 142, as illustrated. Moreover, the mobile device 142 may include a front speaker 154a located at a top portion of a front 146 of the mobile device 142, as illustrated. The mobile device 142 may also include a bottom speaker 154b located at the bottom 148 of the mobile device 142, as illustrated. Of course, other profiles for other types of mobile devices are also contemplated beyond the examples above.

In some embodiments, the audio component layouts 114 may include a second audio component layout included in the second device profile. The second audio component layout may indicate the layout of the microphones 152 and speakers 154 of the mobile device 142. The second audio component layout may indicate the relative locations of the microphones 152 and the speakers 154 with respect to each other. Additionally or alternatively, the second audio component layout may indicate relative distances of the microphones 152 and the speakers 154 between each other. In these or other embodiments, the second audio component layout may indicate relative directions of emission of audio waveforms by the speakers 154 and/or relative directions of detection of audio waveforms by the microphones 152.

In these or other embodiments, the device profiles 106 may accordingly include response profiles 108 that may each include one or more characteristics of one or more audio response waveforms that may each correspond to a respective audio response waveform of a corresponding device represented by a respective device profile 106. In these or other embodiments, response profiles 108 may include characteristics of audio response waveforms that correspond to instances when a user is physically holding mobile devices and that correspond to instances when a user is not physically holding mobile devices. The characteristics may include the audio response waveforms themselves, the frequency components of the audio response waveforms, the magnitudes of the audio response waveforms, or any other characteristic that may be identified and affected by whether a user is physically holding the mobile device.

For example, a particular response profile of the response profiles 108 may include a first example response waveform representation that may be based on a first example response waveform measured by one or more microphones of a particular mobile device (e.g., the mobile device 130 of FIG. 1B or the mobile device 142 of FIG. 1C). The first example response waveform may be based on a first particular audio detection waveform that may be emitted by one or more speakers of the particular mobile device. In some embodiments, the first example response waveform may correspond to an instance in which the particular mobile device is not being physically held by a user.

In these or other embodiments, the particular response profile of the response profiles 108 may include a second example response waveform representation that may be based on a second example response waveform measured by the same microphones of the particular mobile device as the first example response waveform. The second example response waveform may be based on a second particular audio detection waveform that may be the same as or substantially the same as the first particular audio detection waveform. Additionally or alternatively, the second particular audio detection waveform may be emitted by the same speakers of the first mobile device as the first particular audio detection waveform, but in an instance in which the first mobile device is being physically held by a user. The differences between the first example response waveform and the second example response waveform may be caused by how the holding of the particular mobile device affects the propagation of the particular audio detection waveforms and the example response waveforms.

Figure 1D:
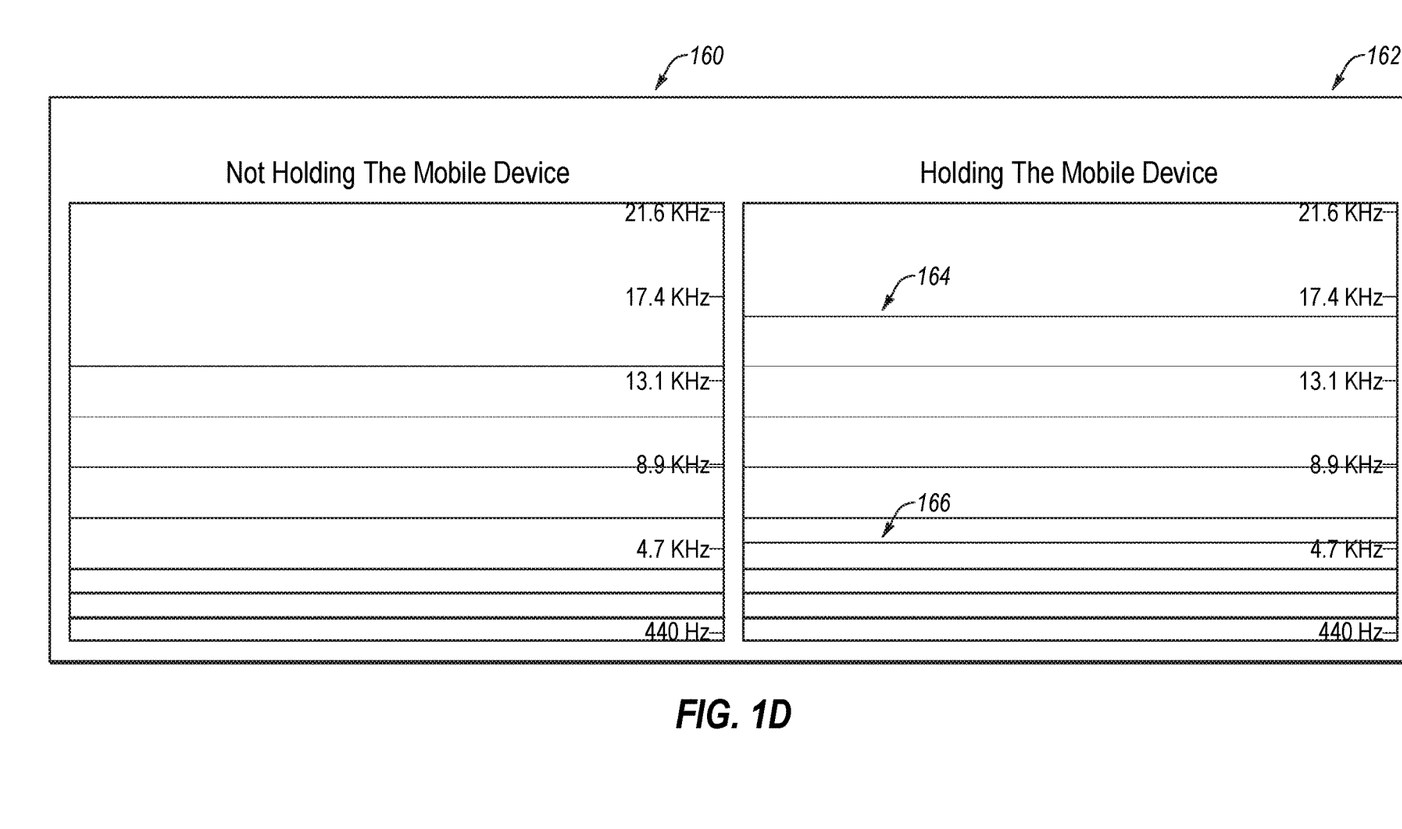
FIG. 1D includes example audio response waveform representations that indicate whether a mobile device is being physically held by a user.

By way of example, FIG. 1D includes example audio response waveform representations that indicate whether a mobile device is being physically held by a user. In particular, FIG. 1D includes a first frequency response 160 of a first response waveform in an instance in which user is not holding the particular mobile device. In some embodiments, the first frequency response 160 may be obtained by performing a Fourier transform with respect to the first response waveform. FIG. 1D also includes a second frequency response 162 of a second response waveform in an instance in which the user is holding the particular mobile device. In some embodiments, the second frequency response 162 may be obtained by performing a Fourier transform with respect to the second response waveform. As indicated by a comparison between the first frequency response 160 and the second frequency response 162, the holding of the particular mobile device may introduce a first frequency component 164 and a second frequency component 166 in the second frequency response 162 that may not be as prevalent or found in the first frequency response 160.

The different audio component layouts of the mobile devices that are represented by the device profiles 106 (e.g., the mobile devices 130 and 142 of FIGS. 1B and 1C, respectively) may result in different measured audio response waveforms as measured by the same mobile device depending on which speakers and microphones are used in the emitting and measuring. For example, a first audio response waveform as measured by the rear microphone 138c of the mobile device 130 that is based on a first audio detection waveform emitted by the bottom speaker 140a and/or the bottom speaker 140b of the mobile device 130 may be different from a second audio response waveform as measured by the top microphone located at the portion 139 of the mobile device 130 that is based on a second audio detection waveform emitted by the bottom speaker 140a and/or the bottom speaker 140b.

Additionally or alternatively, the different audio component layouts of the mobile devices that are represented by the device profiles 106 (e.g., the mobile devices 130 and 142 of FIGS. 1B and 1C, respectively) may result in different measured audio response waveforms between different mobile devices. For example, with all other things being equal, a first audio response waveform as measured by the rear microphone 138c of the mobile device 130 that is based on a first audio detection waveform emitted by the bottom speaker 140a and/or the bottom speaker 140b of the mobile device 130 may be different from a second audio response waveform as measured by the top microphone 152a of the mobile device 142 that is based on a second audio detection waveform emitted by the bottom speaker 160b of the mobile device 142. The differences may be due to the relative locations of the emitting speakers and measuring microphones.

As indicated above, in some embodiments, the response profiles 108 may include one or more particular response profiles that are linked and correspond to a particular device profile of the device profiles 106 that is for a respective particular mobile device. The linking of the particular response profiles to the particular mobile device may be used to identify which response profile of the response profiles 108 may pertain to the mobile device 120. For example, the mobile device 120 may be the same type of device as the mobile device 130 such that response profiles that are linked to the first device profile of the device profiles 106 (which may correspond to the mobile device 130 as discussed above) may be used to determine whether the mobile device 120 is being physically held by a user.

In these or other embodiments, the one or more particular response profiles may include different response profiles that relate to different combinations of microphones and speakers of the particular mobile device that may be used to emit audio detection waveforms and measure corresponding audio response waveforms. In some embodiments, the particular response profiles may include response profiles that correspond to every possible permutation of microphones and speakers of the particular mobile device that may be used to obtain a response profile for the particular mobile device. For example, the response profiles 108 may include one or more first response profiles that may correspond to the first device profile of the device profiles 106 that corresponds to the mobile device 130 of FIG. 1B. Similarly, the response profiles 108 may include one or more second response profiles that may correspond to the second device profile of the device profiles 106 that corresponds to the mobile device 142 of FIG. 1C.

In some embodiments, one or more characteristics of the audio detection waveforms may be varied. For example, the frequencies, durations, tempos, amplitude, etc. may be varied, which may result in different corresponding audio response waveforms. In some embodiments, the response profiles 108 may include different response profiles that correspond to different audio detection waveforms.

In some embodiments, the response profiles 108 may include response profiles that are obtained in varying conditions. In these or other embodiments, multiple samples of the response profiles in the varying conditions may be obtained. The number of samples may include any suitable number and may number in the single digits to the tens, hundreds, or thousands. In some embodiments, an average of the multiple samples may be obtained.

In some embodiments, the response profiles 108 may be obtained by performing physical tests using mobile devices that correspond to the device profiles 106 and using actual users. Additionally or alternatively, the response profiles 108 may be obtained using any suitable simulation.

Further, in some instances, the response profiles may be obtained using fewer device types than those that are included in the device profiles. For example, different device types may have the same or similar speaker/microphone layouts such that a response profile for a first device type may be used for a second device type that has a similar layout. Additionally or alternatively, the different device types may have overall different speaker/microphone layouts, but the relatively positions of certain speakers and microphones may be similar. In these or other embodiments, a particular response profile associated with a first speaker/microphone configuration of the first device type may be used for a third device type that may have a different overall layout but that may have a second speaker/microphone configuration that is the same as or similar to the first speaker/microphone configuration with respect to relative locations with each other.

In some embodiments, the device profiles 106 may include any other characteristics of the different types of mobile devices that may relate to physical user determinations. For example, the device profiles 106 may include one or more audio detection characteristics 116 of each of one or more of the devices that may be represented by the device profiles 106. Mobile devices may include audio filtering software and/or hardware that may be configured to filter out background noise and/or other types of unwanted sound that may be detected by their corresponding microphones. As such, certain frequencies of the audio response waveforms may be filtered, which may affect physical user determinations.

In these or other embodiments, the audio detection characteristics 116 may include the detection capabilities of the microphones of a corresponding device type. For example, certain microphones may be able to detect sound in certain frequency ranges, and such frequency ranges my be included in the audio detection characteristics.

As discussed in further detail below, the audio detection characteristics 116 may be used to generate audio detection waveforms. For example, the audio detection waveforms may be generated to have frequencies that may be outside of the frequency bands that may be filtered by the mobile device 120 to account for the filtering that may occur. Additionally or alternatively, the audio detection waveforms may be generated to have frequencies that may be within the frequency ranges that may be detected by microphones that may be used to measure the corresponding audio response waveforms.

Figure 1E:
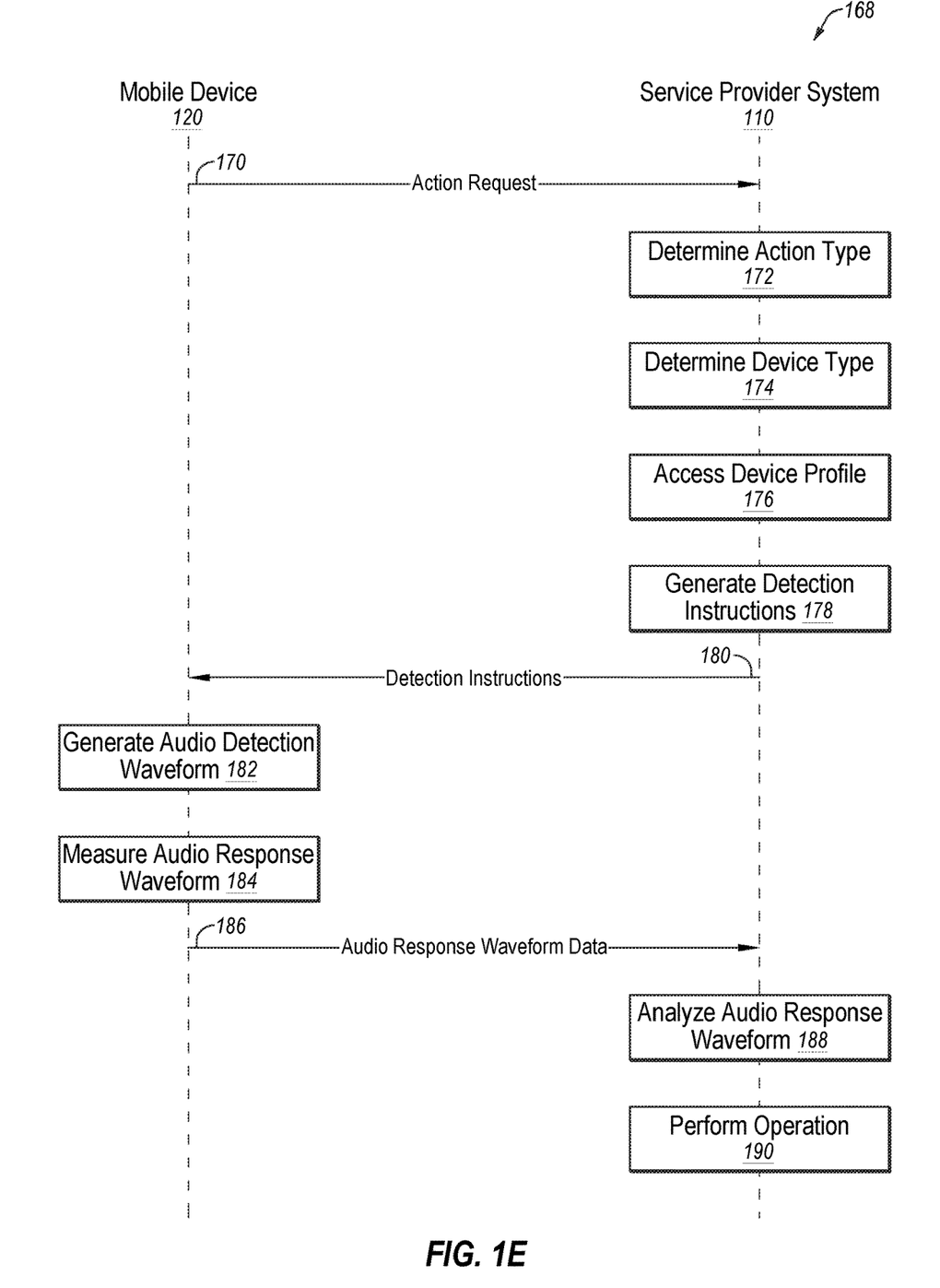
FIG. 1E illustrates example operations related to determining whether a mobile device is being physically held by a user.

FIG. 1E illustrates example operations 168 that may be conducted between the mobile device 120 and the system 110 with respect to determining whether the mobile device 120 is being physically held by a user. In some embodiments, the operations 168 may be directed by the detection module 102.

In some embodiments, the operations 168 may include an operation 170 at which the mobile device 120 may communicate an action request to the system 110. The action request may include a request for the system 110 to perform a particular action that may be related to services that may be rendered by the system 110. For example, the system 110 may be configured to perform financial services and the action request may include a request to transfer funds. In some embodiments, the action request may be performed via the application 122 and/or the browser 124 and may be communicated over the network 112.

At operation 172, the system 110 may be configured to determine an action type for the requested action. For example, as indicated above, the system 110 may determine that the action type is a financial transaction. In some instances, certain types of actions may be more security sensitive than others. For example, a general request to access a website may be less security sensitive than a request to transfer funds or access a user account. Further, security attacks may often be performed by emulated mobile devices or mobile device farms. As such, in some embodiments, the system 110 may be configured to make a physical user determination with respect to the action request depending on the type of action. In these or other embodiments, a security sensitivity level may be assigned to different action types and whether or not to make a physical user determination may be based on the whether the security sensitivity level of the action type of the received action satisfies a security threshold. In some embodiments, an administrator of the system 110 may determine the security sensitivity level of different action types and/or the security threshold. Additionally or alternatively, the security sensitivity level and/or the security threshold may be based on an analysis of actions that are most often associated with security threats.

At operation 174, the system 110 may determine a device type of the mobile device 120. In some embodiments, the system 110 may communicate a request to the mobile device 120 for model information of the mobile device 120 to determine the device type. In these or other embodiments, the system 110 may determine the device type based on an operating system or application that is used to communicate the action request. Additionally or alternatively, the mobile device 120 may be associated with a particular user account associated with the system 110 such that the system 110 determines the device type based on information stored in the user account. In these or other embodiments, the action request may include the device type information.

At operation 176, the system 110 may access a particular device profile from the device profiles 106 that may correspond to a same device type as the device type of the mobile device 120, as determined at operation 174.

At operation 178, the system 110 may be configured to generate user detection instructions. The user detection instructions may include electronic instructions that may be executable by the mobile device 120. The user detection instructions may instruct the mobile device 120 to emit a particular audio detection waveform using one or more of the speakers 128 and to measure a corresponding audio response waveform using one or more of the microphones 126. In some embodiments, the system 110 may use the particular device profile to generate the user detection instructions.

For example, the system 110 may identify the speakers 128 and the microphones 126 of the mobile device 120 using the particular device profile. Further, the system 110 may identify the relative locations of the speakers 128 and the microphones 126 using the particular device profile. In these or other embodiments, based on the identified speakers 128 and microphones 126 and their relative locations with respect to each other, the system 110 may select one or more particular speakers of the speakers 128 for emission of the audio detection waveform and one or more particular microphones of the microphones 126 for measuring of the corresponding audio response waveform. The selected particular speaker(s) and the particular microphone(s) may be included in the detection instructions.

In some embodiments, the selection of the particular speaker(s) and the particular microphone(s) may be based on their relative locations with respect to each other. For example, to reduce a likelihood of feedback, the particular speaker(s) and the particular microphone(s) may be selected based on them being a certain distance away from each other, as indicated by the particular device profile. In these or other embodiment, the selection of the particular speaker(s) and the particular microphone(s) may be performed using a randomization operation. Additionally or alternatively, the selection of the particular speaker(s) and the particular microphone(s) may be based on a configuration of speakers and microphones that is associated with a particular response profile that corresponds to the particular device profile. In these or other embodiments, the randomization selection may be limited to the speaker/microphone permutations that are associated with the response profiles of the particular device profile.

The detection instructions may also include instructions related to generation of the audio detection waveform. For example, the system 110 may determine an audio detection waveform that may be emitted by the particular speaker(s) of the mobile device 120. The system 110 may additionally determine one or more characteristics of the audio detection waveform, such as a duration, a tempo, a number of audio pulses that may be included in the audio detection waveform, tempos of the audio pulses, durations of audio pulses, magnitudes of the audio detection waveform (e.g., magnitudes of the audio pulses), frequencies of the audio detection waveform (e.g., frequencies of pulses of the audio detection waveform), etc. Further, the audio detection waveform may include any combination of sounds and may include, for example, audio tones, music, words, etc. In these or other embodiments, one or more of the characteristics of the audio detection waveform may be selected according to a randomization operation such that the audio detection waveform may be randomized. In these or other embodiments, the randomization of the audio detection waveform characteristics may be limited to the specific audio waveforms that are associated with the response profiles of the particular device profile.

In some embodiments, the frequencies of the audio detection waveform may be determined such that they are on the edge of the normal hearing range of people. For example, humans may typically be able to perceive sounds that have frequencies between 20 hertz (Hz) and 20 kHz. As such, in some embodiments, the frequencies of the audio detection waveform may be selected as being less than 25 Hz or greater than 15 kHz in some instances. Additionally or alternatively, the frequencies of the audio detection waveform may be within the normal hearing range such as between 1 kHz and 3 kHz. Audio detection waveforms are not limited to these ranges, however, in various embodiments.

In these or other embodiments, the frequencies of the audio detection waveform may be based on the detection capabilities of the selected particular microphone(s), which may be indicated by particular audio detection characteristics that may be included in the particular device profile. Additionally or alternatively, the frequencies of the audio detection waveform may be based on the filtering characteristics of the mobile device 120, as indicated by the particular audio detection characteristics.

The detection instructions may include instructions for the mobile device 120 to generate, via the selected particular speaker(s) the audio detection waveform according to the determined characteristics of the audio detection waveform. In these or other embodiments, the detection instructions may include instructions for the mobile device 120 to measure, via the selected particular microphone(s), the audio response waveform that corresponds to the audio detection waveform. Additionally or alternatively, the detection instructions may include instructions that direct the mobile device 120 to communicate the measured audio response waveform back to the system 110.

In some embodiments, the detection instructions may include instructions for the mobile device 120 to measure background noise prior to emitting the audio detection waveform and measuring the corresponding audio response waveform. In these or other embodiments, the instructions may direct the mobile device 120 to measure the background noise using the selected particular microphone(s). Further, the instructions may direct the mobile device 120 to communicate the measured background noise to the system 110.

At operation 180, the system 110 may communicate the detection instructions to the mobile device 120. At operation 182, the mobile device 120 may generate the audio detection waveform by emitting the audio detection waveform via the selected particular speaker(s) indicated by the detection instructions. Additionally or alternatively, the emitted audio detection waveform may be generated to have the characteristics that are indicated by the detection instructions. At operation 184, the mobile device 120 may measure, via the selected particular microphone(s), the audio response waveform that corresponds to the audio detection waveform, as indicated by the received detection instructions.

At operation 186, the mobile device 120 may communicate audio response waveform data to the system 110. The audio response waveform data may include any suitable data that indicates the measured audio response waveform. In some embodiments, the mobile device 120 may communicate measured background noise data to the system 110 at operation 186 as well. The background noise data may include any suitable data that indicates the measured background noise.

At operation 188, the system 110 may analyze the audio response waveform that may be indicated by the received audio response waveform data. The analysis of the audio response waveform may be used to determine whether the mobile device 120 is being physically held by a user.

For example, in some embodiments, the system 110 may perform a Fourier transform to obtain a frequency response of the audio response waveform. Additionally or alternatively, the system 110 may identify amplitudes of the audio response waveform, a duration of the audio response waveform, or any other characteristic of the audio response waveform that may be compared against corresponding characteristics indicated by one or more particular response profiles and that may indicate whether the mobile device 120 is being physically held by a user.

In these or other embodiments, the system 110 may be configured to identify the particular response profiles that may be used in the comparison. For example, the particular response profiles may be linked to the particular device profile that corresponds to the device type of the mobile device 120. Additionally or alternatively, the particular response profiles may correspond to the particular speaker/microphone layout used to obtain the audio response waveform. Additionally or alternatively, the particular response profiles may correspond to the particular audio detection waveform used to obtain the audio response waveform. In these or other embodiments, the particular response profiles may include a first response profile that corresponds to a user physically holding a mobile device and a second response profile that corresponds to a user not physically holding the mobile device.

The analysis of the audio response waveform may include comparing one or more characteristics of the audio response waveform against one or more characteristics of the identified particular response profiles. For example, in some embodiments, a particular characteristic (e.g., frequency response) of the audio response waveform may be compared against the particular characteristic as indicated in the first response profile and the second response profile. In response to the particular characteristic of the audio response waveform being closer that of the first response profile than the second response profile, it may be determined that the mobile device 120 is being physically held by a user. In contrast, in response to the particular characteristic of the audio response waveform being closer that of the second response profile than the first response profile, it may be determined that the mobile device 120 is being physically held by a user.

Additionally or alternatively, the comparison may be against one response profile. For example, in response to differences in the particular characteristic between the audio response waveform and the first response profile being within a first threshold value, it may be determined that the mobile device 120 is being physically held by a user. Similarly, in response to differences in the particular characteristic between the audio response waveform and the first response profile being outside of the first threshold value, it may be determined that the mobile device 120 is not being physically held by a user. Similarly, in response to differences in the particular characteristic between the audio response waveform and the second response profile being within a second threshold value, it may be determined that the mobile device 120 is not being physically held by a user.

The threshold values may be selected depending on a selected degree of accuracy/inclusiveness of determinations. For example, in instances in which the degree of accuracy/inclusiveness is such that false positives that the mobile device 120 is being physically held are deemed to be less problematic than false negatives that the mobile device 120 is not being physically held, the threshold values may be set such that relatively larger deviations with respect to the first response profile may still be within the first threshold value than in instances in which the false positives are given a lower priority.

In these or other embodiments, the analysis of the audio response waveform may include an analysis of a response time for the mobile device 120 to communicate the audio response waveform data after the system 110 communicates the detection instructions. In some instances, a bad actor may attempt to simulate the audio response waveform based on the instructed audio detection waveform such that it appears that the mobile device 120 is physically being held by a user. However, in instances in which the audio detection waveform and/or the particular speaker/microphone configuration are not known beforehand (e.g., in instances in which the audio detection waveform and/or the particular speaker/microphone configuration are randomized), the generation of a simulated audio response waveform that spoofs a person holding the mobile device 120 may take more time than obtaining an actual audio response waveform such that the response time may be greater. As such, in some embodiments, the system 110 may determine whether the response time is within a threshold amount of time. In response to the response time being longer than the threshold amount of time, the system 110 may determine that the mobile device 120 is not being physically held by a user. In these or other embodiments, the determination that the mobile device 120 is not being physical held by a user based on the response time may override a determination that the mobile device is being physically held by a user based on a comparison with the particular response profiles.

In these or other embodiments, the analysis of the audio response waveform may be based on the background noise data that may be communicated to the system 110. For example, in some embodiments, the background noise, as indicated by the background noise data, may be subtracted out of the audio response waveform. In these or other embodiments, the background noise may be subtracted prior to performing any other analysis on the audio response waveform.

At operation 190, the system 110 may perform a particular operation in response to the determination as to whether the mobile device 120 is being physically held by a user. For example, in response to a determination that the mobile device 120 is being physically held by a user, the system 110 may grant the action request received at operation 170 and perform one or more operations accordingly. In these or other embodiments, the system 110 may communicate an action response to the mobile device 120 that provides information requested in the action request or that confirms performance of the requested action. As another example, in response to a determination that the mobile device 120 is not being physically held by a user, the system 110 may deny the action request received at operation 170 and perform one or more operations accordingly. In these or other embodiments, the system 110 may communicate an action response to the mobile device 120 that denies information requested in the action request or that confirms denial of performance of the requested action.

The particular operation taken in response to the physical user presence determination may thus vary depending on what original action is being taken using a mobile device 120. If the mobile device 120 is attempting to post a review of item or service, the review posting may be denied or flagged for review if no physical user is believed to be holding the mobile device. A financial transaction or attempt to change account information may also be denied. The user may have to verify additional information to complete the action (e.g. by calling a customer service agent to provide additional verification information). Transaction limits may be placed on an account if one or more transaction attempts (or account login attempts) are made from a device where no physical user is determined to be holding the mobile device. E.g. if a device attempted to login to a user account three times in one minute and at each login attempt it appeared the mobile device was not physically held by a human being, that account might be locked until a call to a customer service agent met additional verification and/or security requirements.

In these or other embodiments, the mobile device 120 may perform one or more operations based on the action response. For example, the mobile device 120 may provide a notification as to confirmation or denial of the action request. In these or other embodiments, the notification may indicate that denial is due to a determination that a user is not physically holding the mobile device.

Additionally or alternatively, the system 110 may perform one or more secondary verification operations to verify whether the mobile device 120 is in fact being held by a user or not being held by a user. For example, the system 110 may request performance of a captcha operation at the mobile device 120. As another example, the system 110 may direct the mobile device 120 to instruct a user to pick up the mobile device and re-send the action request. In some embodiments, the secondary verification operation may be performed in response to a determination that the mobile device 120 is not being physically held by a user. Additionally or alternatively, the secondary verification operation may be performed in response to a determination that the mobile device 120 is being physically held by a user.

Figure 1F:
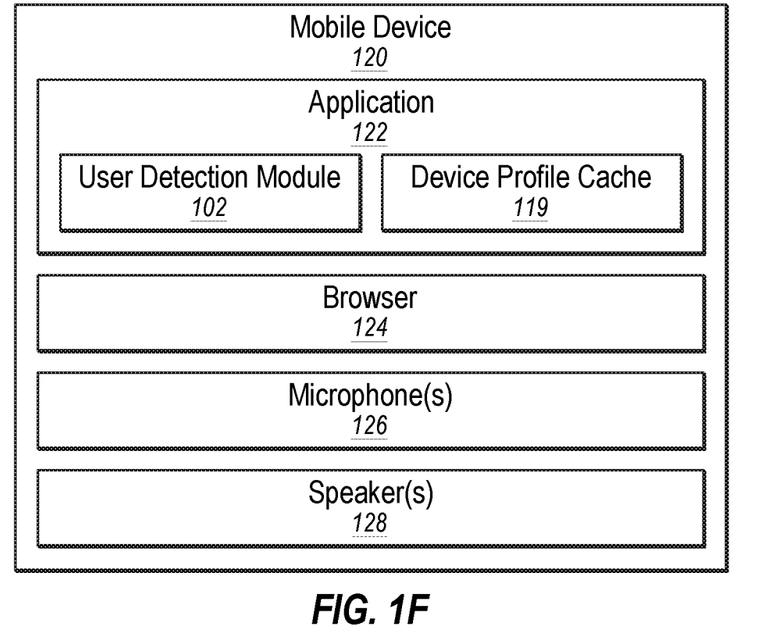
FIG. 1F illustrates an example variation of the mobile device of FIG. 1A.

Modifications, additions, or omissions may be made to the embodiments described in FIGS. 1A-1E without departing from the scope of the present disclosure. For example, the environment 100 may include more or fewer elements than those illustrated and described in the present disclosure. As another example, the mobile device 120 may be configured to perform one or more operations described as being performed by the system 110. For instance, as illustrated in FIG. 1F, in some embodiments, the mobile device 120 may include the user detection module 102 as part of the mobile application 122. Additionally or alternatively, the mobile application 122 may be configured to include a device profile cache 119 that may include the device profiles 106. In these or other embodiments, the device profiles 106 may be downloaded from a server of a system (e.g., a server of the service provider system 110) for storage in the device profile cache. In these or other embodiments, the mobile device 120 (e.g., via the user detection module 102) may be configured to automatically generate the audio detection waveform, measure the audio response waveform, and/or communicate the audio response waveform data to the system 110 without being explicitly instructed by the system 110. In these or other embodiments, the mobile device 120 may perform one or more of or at least a portion of one or more of operations 172, 174, 176, and 178 with respect to determining a particular speaker/microphone configuration to use and/or with respect to determining one or more characteristics of the audio detection waveform.

Additionally, the above description specifically states the performance of operations to determine whether a user is physically holding the mobile device 120. However, in some embodiments, similar principles may be applied to determine that a user is within a certain physical proximity of the mobile device 120 and not necessarily physically holding the mobile device 120. For example, the response profiles may include instances in which a user is within a particular distance of the mobile device or outside of the particular distance. In these or other embodiments, the differences in the corresponding audio response waveforms may be used to determine whether a user is within the particular distance of the mobile device 120 but not necessarily physically holding the mobile device 120.

Figure 2:
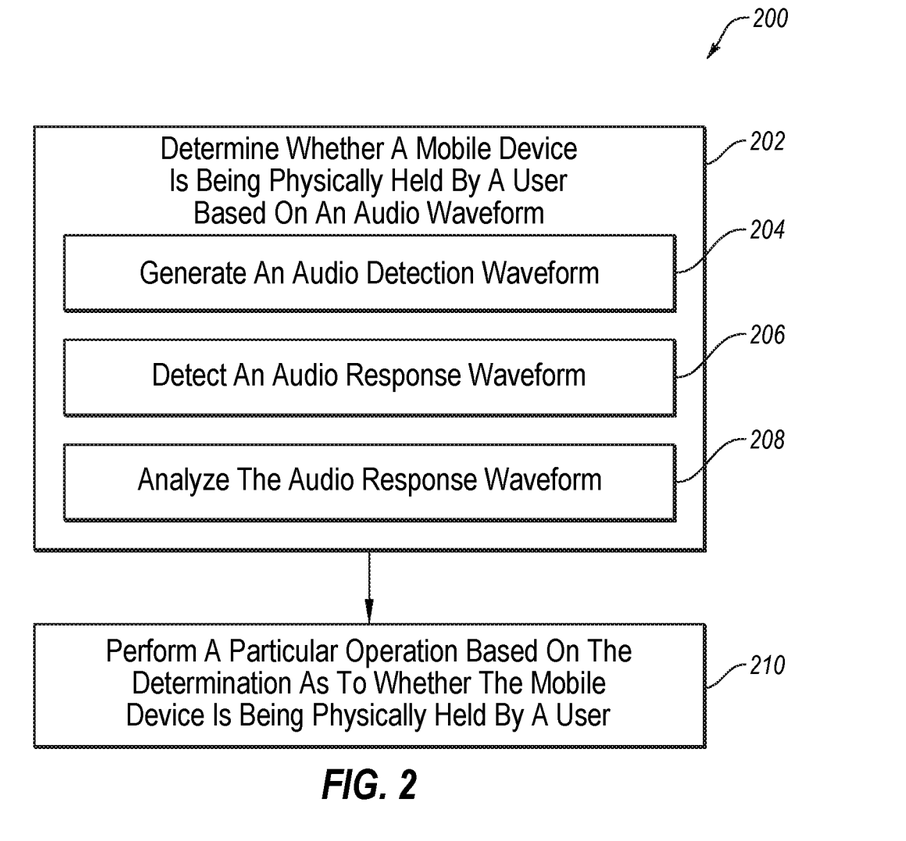
FIG. 2 is a flowchart of an example method to determine whether a mobile device is being physically held by a user.

FIG. 2 is a flowchart of an example method 200 to determine whether a mobile device is being physically held by a user. The method 200 may be arranged in accordance with at least one embodiment described in the present disclosure. One or more of the operations of the method 200 may be performed, in some embodiments, by a device or system, such as the mobile device 120 or the service provider system 110 of FIG. 1A. In these and other embodiments, the method 200 may be performed based on the execution of instructions stored on one or more non-transitory computer-readable media. Although illustrated as discrete blocks, various blocks may be divided into additional blocks, combined into fewer blocks, or eliminated, depending on the particular implementation.

The method 200 may include block 202 at which it may be determined whether a mobile device is being physically held by a user. In some embodiments, the determination may be made by a service provider system in response to an action request received by the service provider system from the mobile device. In these or other embodiments, the determination may be made in response to the action being of a particular action type, such as described above with respect to FIG. 1E.

In some embodiments, the determination as to whether the mobile device is being physically held by a user may include a block 204. At the block 204, an audio detection waveform may be generated. In some embodiments, the audio detection waveform may be generated by the mobile device based on one or more of the operations 174, 176, 178, 180, and 182 described above with respect to FIG. 1E.

The determination as to whether the mobile device is being physically held by a user may include a block 206 in some embodiments. At the block 206, an audio response waveform that corresponds to the generated audio detection waveform may be measured. In some embodiments, the measurement of the audio response waveform may be based on one or more operations of the operation 184 described above with respect to FIG. 1E.

The determination as to whether the mobile device is being physically held by a user may include a block 208 in some embodiments. At the block 208, the measured audio response waveform may be analyzed to determine whether the mobile device is being physically held by a user. In some embodiments, the analysis may include one or more operations of operation 188 of FIG. 1E as described above.

In some embodiments, the method 200 may include a block 210. At block 210 a particular operation may be performed based on the determination as to whether the mobile device is being physically held by a user. In some embodiments, the performance of the particular operation may include one or more operations of operation 190 of FIG. 1E as described above.

Modifications, additions, or omissions may be made to the method 200 without departing from the scope of the present disclosure. For example, the outlined operations and actions are only provided as examples, and some of the operations and actions may be optional, combined into fewer operations and actions, or expanded into additional operations and actions without detracting from the essence of the disclosed embodiments.

Figure 3:
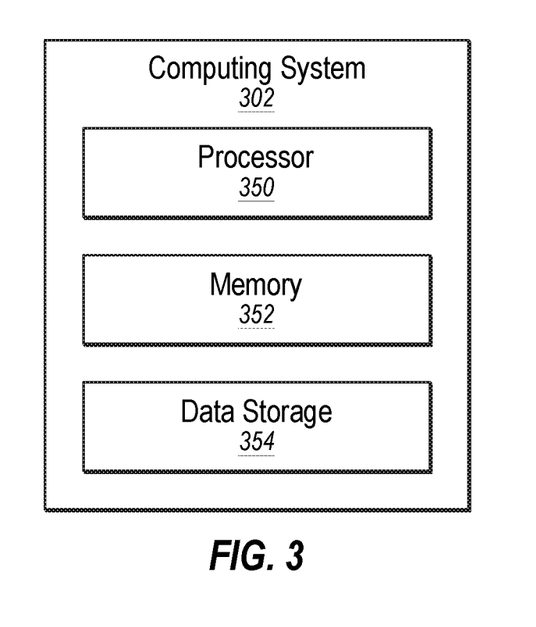
FIG. 3 illustrates an example computing system that may be used to determine whether a mobile device is being physically held by a user.

FIG. 3 illustrates a block diagram of an example computing system 302. The computing system 302 may be configured according to at least one embodiment of the present disclosure and may be an example of computing systems that may include or be part of one or more elements of the environment 100 of FIG. 1A. For example, the mobile device 120 and/or the service provider system 110 may include one or more computing systems 302. Additionally, the computing system 302 may be configured to perform or direct performance of one or more of the operations of FIG. 1E and/or of FIG. 2. The computing system 302 may include a processor 350, a memory 352, and a data storage 354. The processor 350, the memory 352, and the data storage 354 may be communicatively coupled.

In general, the processor 350 may include any suitable special-purpose or general-purpose computer, computing entity, or processing device including various computer hardware or software modules and may be configured to execute instructions stored on any applicable computer-readable storage media. For example, the processor 350 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, the processor 350 may include any number of processors configured to, individually or collectively, perform or direct performance of any number of operations described in the present disclosure. Additionally, one or more of the processors may be present on one or more different electronic devices, such as different servers.

In some embodiments, the processor 350 may be configured to interpret and/or execute program instructions and/or process data stored in the memory 352, the data storage 354, or the memory 352 and the data storage 354. In some embodiments, the processor 350 may fetch program instructions from the data storage 354 and load the program instructions in the memory 352. After the program instructions are loaded into memory 352, the processor 350 may execute the program instructions.

For example, in some embodiments, the user detection module 102 of FIG. 1A may be included in the data storage 354 as program instructions. The processor 350 may fetch the program instructions of the user detection module 102 from the data storage 354 and may load the program instructions of the user detection module 102 in the memory 352. After the program instructions of the user detection module 102 are loaded into memory 352, the processor 350 may execute the program instructions such that the computing system may implement the operations associated with the user detection module 102 as directed by the instructions.

The memory 352 and the data storage 354 may include computer-readable storage media for carrying or having computer-executable instructions or data structures stored thereon. Such computer-readable storage media may include any available media that may be accessed by a general-purpose or special-purpose computer, such as the processor 350. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store program code in the form of computer-executable instructions or data structures and which may be accessed by a general-purpose or special-purpose computer. In these and other embodiments, the term "non-transitory" as explained herein should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

Modifications, additions, or omissions may be made to the computing system 302 without departing from the scope of the present disclosure. For example, in some embodiments, the computing system 302 may include any number of other components that may not be explicitly illustrated or described.

For instance, in some embodiments, the computing system 302 may include a communication unit that includes any component, device, system, or combination thereof that is configured to transmit or receive information over a network. In some embodiments, the communication unit may communicate with other devices at other locations, the same location, or even other components within the same system. For example, the communication unit may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit may permit data to be exchanged with a network and/or any other devices or systems described in the present disclosure. For example, the communication unit may allow the system 602 to communicate with other systems, such as computing devices and/or other networks.

Additionally or alternatively, the computing system 302 may include one or more user interfaces in some embodiments. The user interfaces may include any system or device to allow a user to interface with the system 302. For example, the interfaces may include a mouse, a track pad, a keyboard, and/or a touchscreen, among other devices or systems. The interfaces may also include a graphical user interface that may be presented on a display that may be included with the computing system 302. The display may be configured as one or more displays, like an LCD, LED, or other type of display. The display may be configured to present content such as video, text, user interfaces, and other data as directed by the processor.

As indicated above, the embodiments described herein may include the use of a special purpose or general purpose computer (e.g., the processor 350 of FIG. 3) including various computer hardware or software modules, as discussed in greater detail below. Further, as indicated above, embodiments described herein may be implemented using computer-readable media (e.g., the memory 352 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." For example, the phrase "A or B" should be understood to include the possibilities of "A" or "B" or "A and B" even when the term "and/or" is used elsewhere.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
receiving, by a service provider system, an action request from a mobile device having a microphone and a speaker;
in response to receiving the action request, determining, by the service provider system, whether the mobile device is being physically held by a user, including:
transmitting, by the service provider system to the mobile device, electronic instructions, the electronic instructions executable by the mobile device to cause the mobile device to generate an audio detection waveform via the speaker and measure an audio response waveform via the microphone, the audio response waveform based on the audio detection waveform, wherein the electronic instructions further cause the mobile device to sample background noise in association with emitting the audio detection waveform; and
analyzing, by the service provider system, the audio response waveform to determine whether the mobile device is being physically held by the user, wherein analyzing the audio response waveform includes analyzing the sampled background noise; and
granting the action request based on determining that the mobile device is being physically held by the user.

2. The method of claim 1, further comprising:
determining that an action associated with the action request is a particular type of action and wherein the determining whether the mobile device is being physically held by the user is performed in response the action being the particular type of action.

3. The method of claim 1, wherein determining whether the mobile device is being physically held by the user is based on an association between the audio response waveform and a layout of the microphone and the speaker with respect to the mobile device.

4. The method of claim 1, wherein analyzing the audio response waveform includes comparing the audio response waveform with a stored audio response profile.

5. The method of claim 1, further comprising determining one or more characteristics of the audio detection waveform according to a randomization operation, wherein the electronic instructions include instructions to generate the audio detection waveform to have the one or more randomized characteristics.

6. The method of claim 1, wherein determining whether the mobile device is being physically held by the user is further based on a response time of the mobile device to communicate data that represents the audio response waveform.

7. The method of claim 1, wherein the electronic instructions further cause the mobile device to sample the background noise prior to emitting the audio detection waveform and wherein analyzing the audio response waveform and the sampled background noise includes subtracting the sampled background noise from the audio response waveform.

8. The method of claim 1, wherein:
the mobile device includes a plurality of speakers;
the method further comprises selecting the speaker from the plurality of speakers for generation of the audio detection waveform according to a randomization operation; and
the electronic instructions indicate that the mobile device is to use the speaker as selected according to the randomization operation.

9. The method of claim 1, wherein:
the mobile device includes a plurality of microphones;
the method further comprises selecting the microphone from the plurality of microphones for detection of the audio response waveform according to a randomization operation; and
the electronic instructions indicate that the mobile device is to use the microphone as selected according to the randomization operation.

10. One or more non-transitory computer-readable storage media configured to store instructions that cause a system to perform operations, the operations comprising:
receiving an action request from a mobile device having a microphone and a speaker;
in response to receiving the action request, determining whether the mobile device is within a particular distance of a user, including:
transmitting electronic instructions to the mobile device, the electronic instructions executable by the mobile device to cause the mobile device to generate an audio detection waveform via the speaker and measure an audio response waveform via the microphone, wherein the audio response waveform is based on the audio detection waveform and wherein the electronic instructions further cause the mobile device to sample background noise in association with emitting the audio detection waveform; and
analyzing the audio response waveform to determine whether the mobile device is within a particular distance of the user, wherein analyzing the audio response waveform includes analyzing the sampled background noise; and
denying the action request based on determining that the mobile device is not within a particular distance of the user.

11. The one or more non-transitory computer-readable storage media of claim 10, wherein the operations further comprise determining one or more frequencies of the audio detection waveform based on a frequency band that is filtered by a filtering operation performed by the mobile device such that the one or more frequencies are outside of the frequency band, wherein the electronic instructions include the one or more frequencies of the audio detection waveform.

12. The one or more non-transitory computer-readable storage media of claim 10, wherein analyzing the audio response waveform includes comparing the audio response waveform with a stored audio response profile.

13. The one or more non-transitory computer-readable storage media of claim 12, wherein the stored audio response profile is associated with a layout of the microphone and the speaker with respect to the mobile device and, wherein use of the stored audio response profile in the comparison is in response to the stored audio response profile being associated with the layout of the microphone and the speaker with respect to the mobile device.

14. The one or more non-transitory computer-readable storage media of claim 10, wherein the operations further comprise determining one or more characteristics of the audio detection waveform according to a randomization operation, wherein the electronic instructions include instructions to generate the audio detection waveform to have the one or more randomized characteristics.

15. The one or more non-transitory computer-readable storage media of claim 10, wherein determining whether the mobile device is within a particular distance of the user is further based on a response time of the mobile device to communicate data that represents the audio response waveform.

16. A mobile device comprising:
one or more speakers configured to emit an audio detection waveform;
one or more microphones configured to:
  measure an audio response waveform that is based on the audio detection waveform; and
  sample background noise;
a communication interface configured to:
  communicate an action request to a service provider system;
  communicate audio response waveform data of the audio response waveform to the service provider system;
  communicate background noise data of the sampled background noise; and
  receive an action request response from the service provider system in which the action request response grants the action request and is based on a determination that the mobile device is being physically held by a user, the determination being based on an analysis of the response waveform data and the background noise data;
one or more processors; and
one or more non-transitory computer-readable storage media communicatively coupled to the one or more processors, the computer-readable storage media including instructions stored thereon that, in response to execution by the one or more processors, cause the mobile device to perform operations, the operations comprising:
  sampling of the background noise;
  generation of the audio detection waveform;
  measurement of the audio response waveform;
  communication of the audio response waveform data;
  communication of the background noise data; and
  performance of one or more operations based on the action request response.

17. The mobile device of claim 16, wherein the one or more speakers are selected for generation of the audio detection waveform according to a randomization operation.

18. The mobile device of claim 16, wherein the one or more microphones are selected for measurement of the audio detection waveform according to a randomization operation.

19. The mobile device of claim 16, wherein one or more characteristics of the audio detection waveform are determined according to a randomization operation.

20. The mobile device of claim 16, wherein the sampling of the background noise is prior to generation of the audio detection waveform.

* * * * *